United States Patent [19]

Takeda et al.

[11] Patent Number: 5,210,826
[45] Date of Patent: May 11, 1993

[54] DATA COMMUNICATION APPARATUS HAVING BANDWIDTH SELECTION CAPABILITIES

[75] Inventors: Takashi Takeda; Hiroshi Hamada; Haruo Ishizuka, all of Tokyo; Kanichi Yoshino, Yokohama; Yoshihisa Tadokoro, Yokohama; Naoyuki Matsumoto, Yokohama, all of Japan

[73] Assignee: Canon Kabushiki Kaisha, Tokyo, Japan

[21] Appl. No.: 553,568

[22] Filed: Jul. 18, 1990

[30] Foreign Application Priority Data

Jul. 20, 1989 [JP] Japan .................. 1-186114

[51] Int. Cl.5 .............................. G06F 13/00
[52] U.S. Cl. ........................ 395/200; 375/8; 370/32; 358/442
[58] Field of Search ............ 364/DIG. 1, DIG. 2, 364/514; 370/22, 85.2; 379/100; 395/200, 275, 325; 358/469, 400, 406, 442, 443; 375/8

[56] References Cited

U.S. PATENT DOCUMENTS

| | | | |
|---|---|---|---|
| 4,270,202 | 5/1981 | Stuttard et al. | 370/80 |
| 4,353,097 | 10/1989 | Takeda et al. | 358/287 |
| 4,774,590 | 9/1988 | Haganuma et al. | 358/280 |
| 4,827,349 | 5/1989 | Ogata et al. | 358/256 |
| 4,893,305 | 1/1990 | Fernandez et al. | 370/84 |

FOREIGN PATENT DOCUMENTS 1144762  6/1989  Japan .

OTHER PUBLICATIONS

T. Okada, *Proceedings of the IEEE International Conference on Communications* (May, 1984) vol. 3, pp. 1389-1392.

J. L. Lavoisard, et al., *Communication & Transmission* (Sep., 1987) vol. 9, No. 3, pp. 35-50.

J. P. Delatore, et al., *ISDN Data Networking Application in the Corporate Environment* (Nov./Dec. 1988) vol. 67, No. 6, pp. 107-120.

*Primary Examiner*—Robert L. Richardson
*Attorney, Agent, or Firm*—Fitzpatrick, Cella, Harper & Scinto

[57] ABSTRACT

A data communication apparatus includes a command receiving unit for receiving a command for setting up a call; a discriminating unit for discriminating a bearer capability included in the command received by the command receiving unit; and a judging unit for judging if a modem is to be used or not, in accordance with a discrimination result by the discriminating unit.

11 Claims, 6 Drawing Sheets

DATA COMMUNICATION APPARATUS HAVING BANDWIDTH SELECTION CAPABILITIES

BACKGROUND OF THE INVENTION

1. Field of the Invention

The present invention relates to terminal equipment, and more particularly to communication terminal equipment connected to an integrated service digital network (ISDN) for data transfer to and from a destination terminal.

2. Related Background Art

One type of conventional communication terminal equipment is a facsimile apparatus for transferring image data.

A G3 facsimile apparatus (G3 FAX) connected to an ISDN network has a structure as shown in FIG. 1. Between a communication control unit 13 and a B channel control unit 15, there are provided a modem (V21, V27ter, V29) and a modem control unit 14 connected to a telephone network similar to those built in the G3 FAX.

This is because a D channel control unit 16 for executing a call connection control and call release control sets the bearer capability (BC), i.e. the capability to operate at a particular channel bandwidth, of the network used for the designation of bearer service to that of an audio mode (audible sound bandwidth).

U.S. patent application Ser. No. 276,931 filed on Nov. 28, 1988, which issued as U.S. Pat. No. 5,142,568 on Aug. 15, 1992, discloses a technique in which data is transmitted to the ISDN by coding data with a coding method used by the G3 FAX and modulating it with a modem.

Such a conventional technique, however, is associated with the following disadvantages. Namely, if a bearer capability of a network is set at an audio mode, a modem is required so that the speed of data communication is lowered. Furthermore, since the bearer capability is set at the audio mode, the frequency of transmission errors becomes high.

In view of this, with the above technique disclosed in U.S. patent application Ser. No. 276,931, coded data is directly transmitted to ISDN without using a modem.

In this case, however, if the bearer capability of the network is different from that of a destination terminal equipment, communication cannot be established.

SUMMARY OF THE INVENTION

The present invention aims at eliminating the above-described disadvantages of conventional techniques and providing communication terminal equipment allowing data communication in accordance with the bearer capability of a network.

It is another object of this invention to provide communication terminal equipment allowing data reception by discriminating the bearer capability included in reception information received from an integrated service digital network (ISDN) and judging from discrimination results whether or not a modem is to be used. Data reception therefore becomes possible in accordance with the bearer capability of a called terminal.

It is a further object of this invention to provide a communication terminal apparatus allowing high-speed data communication by making a call with the bearer capability being set at a non-limited digital mode, and transmitting data without using a modem. As used in this specification, the term "non-limited digital mode" shall mean the digital mode of a digital line (e.g. ISDN) which has the original digital bandwidth, i.e. which has not been limited from the available digital bandwidth down to an audio bandwidth.

It is a still further object of this invention to provide communication terminal equipment capable of reducing a frequency of occurrence of transmission errors to be smaller than that when communication is made by using a modem, by making a call with the bearer capability being set at a non-limited digital mode, and transmitting data without using a modem.

It is a further object of this invention to provide communication terminal equipment allowing data communication with a terminal having any type of bearer capability, by making a call with the bearer capability being set at a non-limited digital mode, and if a destination terminal is not set at the nonlimited digital mode, making a call again with the bearer capability being set at an audio mode.

The above and other objects of this invention will become apparent from the following detailed description of the invention when read in conjunction with the accompanying drawings.

DETAILED DESCRIPTION OF THE PREFERRED EMBODIMENTS

Preferred embodiments of this invention will now be described with reference to the accompanying drawings.

Figure 1:
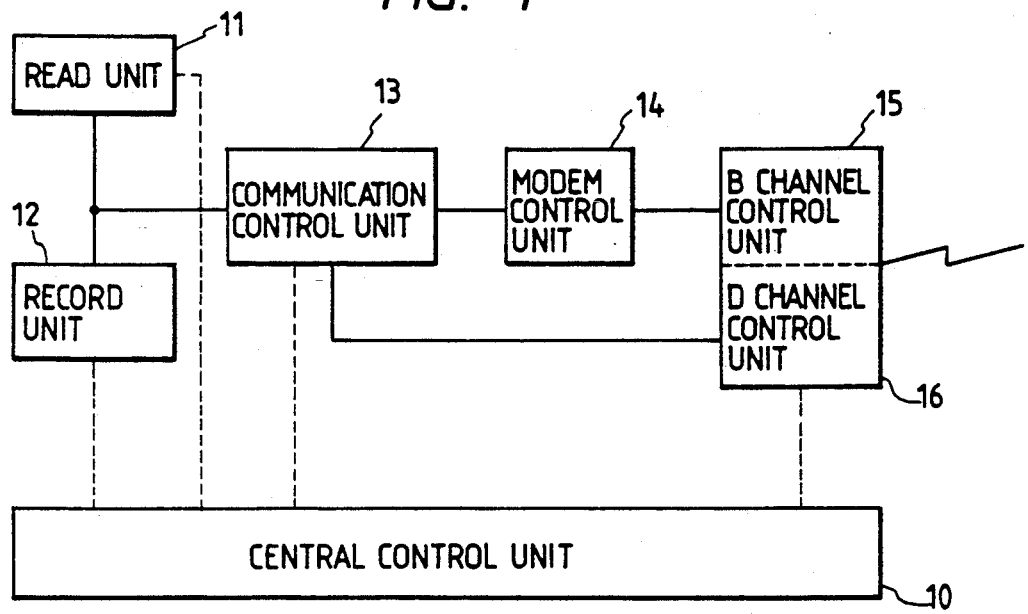
FIG. 1 is a block diagram showing a conventional facsimile apparatus connectable to an integrated service digital network (ISDN)
Figure 2:
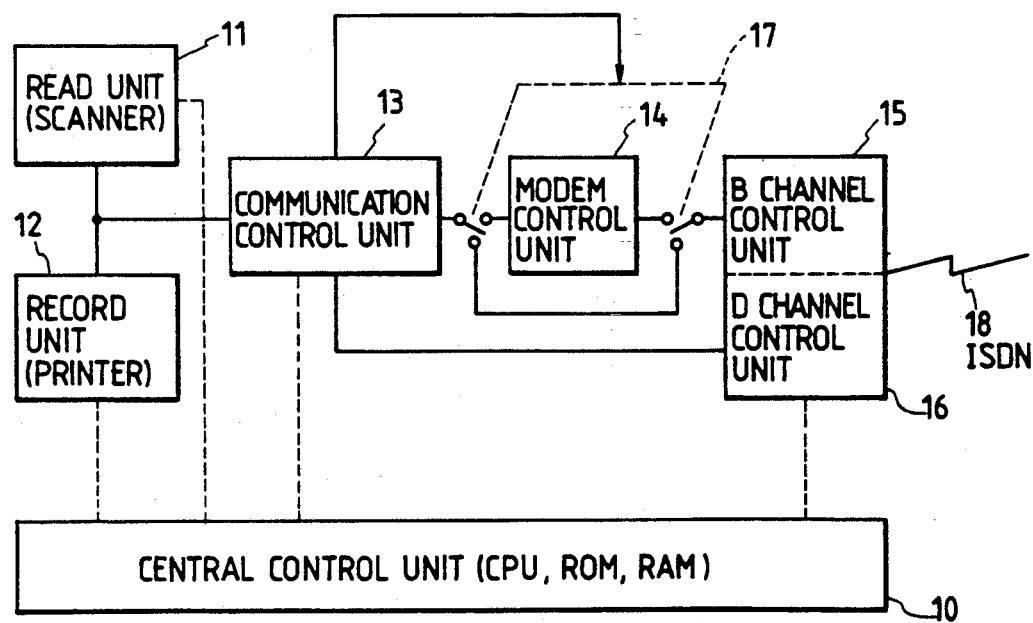
FIG. 2 is a block diagram showing the structure of a facsimile apparatus according to an embodiment of this invention.

Description of Structure (FIG. 2)

FIG. 2 is a schematic block diagram showing the structure of a facsimile apparatus according to the embodiment of this invention.

Referring to FIG. 2, a central control unit 10 for controlling the apparatus is constructed of CPU, ROM, RAM and peripheral circuits. A read unit (scanner) 11 reads an image to be transmitted and converts the image into a white/black binary image signal. A record unit (printer) 12 records the received white/black binary image signal. A communication control unit 13 performs a G3 protocol in conformity with CCITT Recommendations T.4, T.30 and an image compression of an image read with the read unit 11. A modem control unit 14 including a modem modulates the compressed data and demodulates received data. A B channel control unit 15 controls the information channel (B channel) used for the transfer of image data to and from an ISDN. A D channel control unit 16 controls the control channel (D channel) used for the transfer of control data to and from an ISDN, the control data including data associated with call connection control, call release control, and the like. Switches 17 are used for switching between using the modem of the modem control unit 14 or not using it. Reference numeral 18 represents an ISDN having the information and control channels.

The control procedure of the facsimile apparatus constructed as above will be described with reference to the flow charts of FIGS. 3 and 5 and procedure signals shown in FIGS. 4, 6 and 7.

Figure 3:
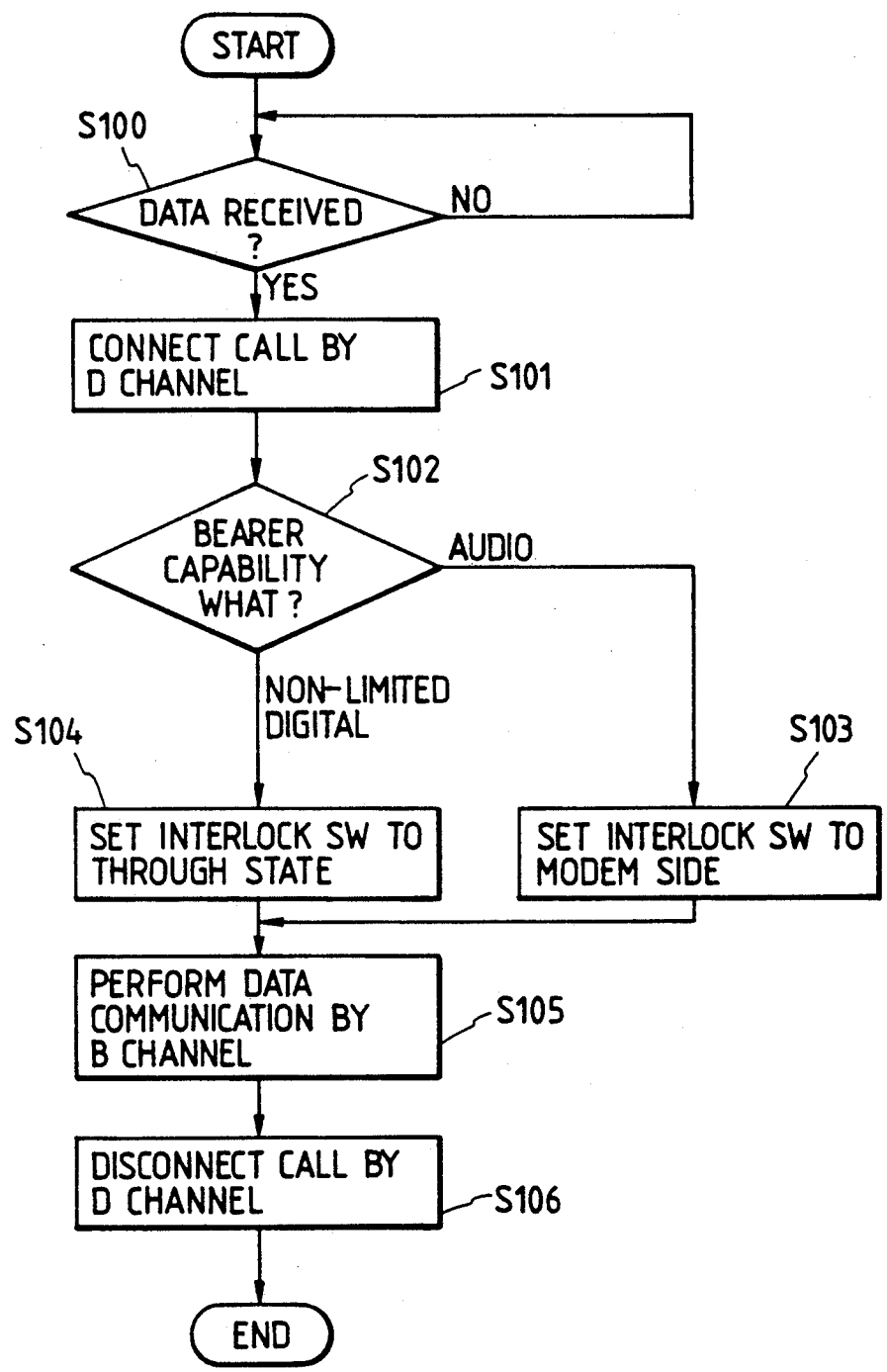
FIG. 3 is a flow chart showing the control procedure for data reception according to the embodiment of this invention.

The flow chart of FIG. 3 shows the control procedure for data reception. At step S100, when a call is received at the D channel control unit 16, a call reception is announced to the central control unit 10. At step S101 the central control unit 10 instructs the apparatus to connect the call. At next step S102 the received bearer capability (included in the received control data) is discriminated. If the discrimination result indicates a non-limited digital mode, that the call is being made in the step S104 the switches 17 are turned to the side so that the call is not passed through the modem control unit 14. Accordingly, the data received by the B channel control unit 15 is directly sent to the communication control unit 13.

If the received bearer capability indicates an audio mode at the step S102, at step S103 the switches 17 are turned to the side so that the call is passed through the modem control unit 14. Accordingly, the data received by the B channel control unit 15 is demodulated by the modem control unit 14 and sent to the communication control unit 13. At step S105, data communication with the partner terminal is executed in accordance with CCITT Recommendations T.4 and T.30. After completion of image data reception, at step S106 the call is disconnected to terminate the communication. The received data is decoded by the communication control unit 13 and printed out by the printer 12.

According to this embodiment, the modem control unit is selectively used in accordance with a received bearer capability so that the performance of communication with a G3 facsimile apparatus connected to the ISDN is considerably improved and the communication network can be expanded.

Figure 4:
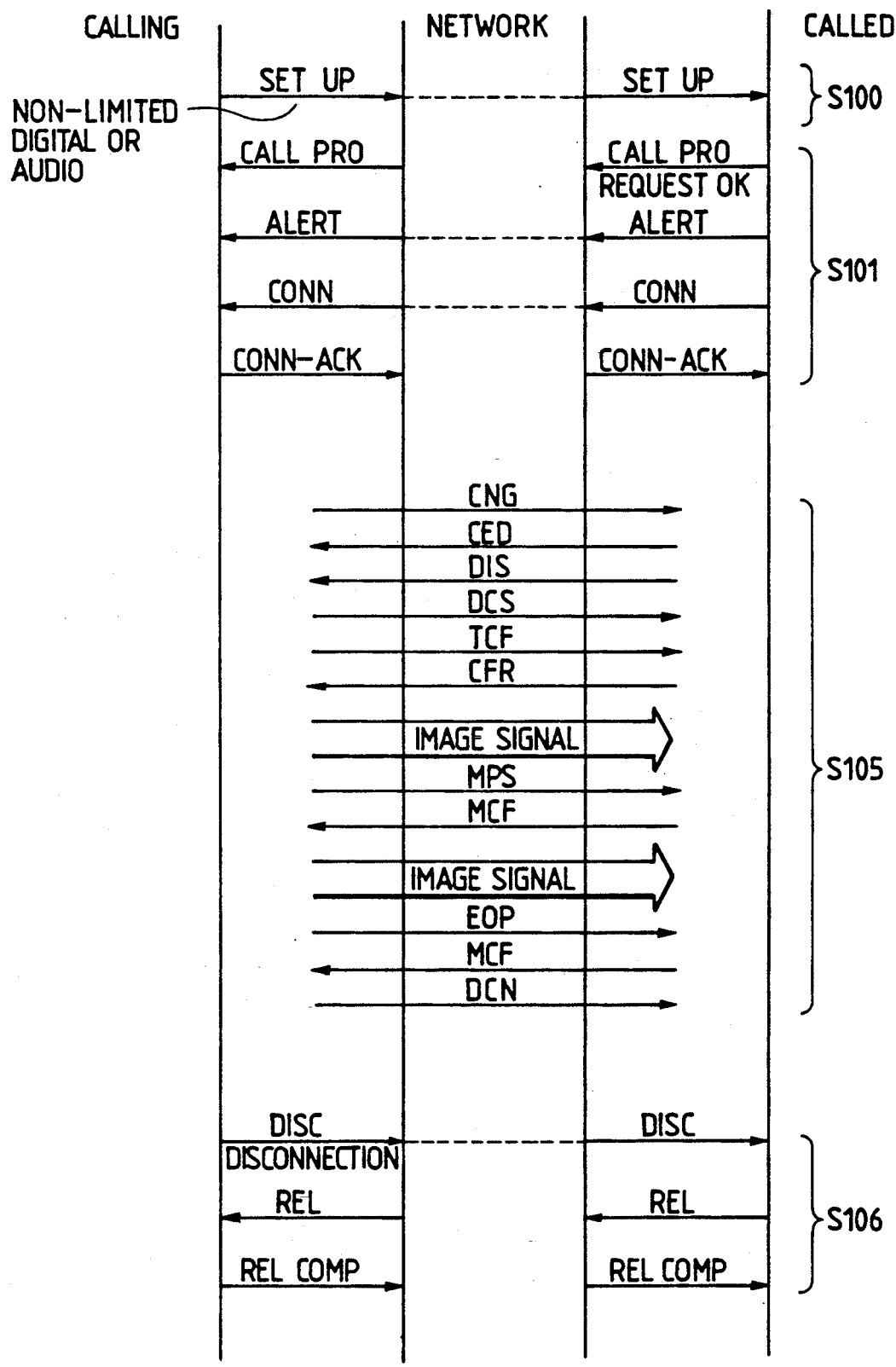
FIGS. 4, 6 and 7 are diagrams showing procedure signals transferred between a calling terminal and called terminal.

FIG. 4 shows procedure signals transferred between a calling terminal and a called terminal in accordance with the protocol shown in FIG. 3. Step numbers S100, S105 and S106 at the called terminal side in FIG. 4 correspond to those shown in the flow chart of FIG. 3.

A calling terminal sends to the ISDN a setup command for requesting a call setup with a network bearer capability being added thereto. A called terminal receiving the setup command discriminates if the bearer capability added to the setup command indicates an audio mode or a non-limited digital mode.

A call proceeding command is returned back to send an acknowledgement of the setup requested by the calling terminal. Thereafter, an alert signal is transmitted to notify the called terminal of an incoming call. When the called terminal responds to it by means of automatic reception, a connect command notifying of such effect is transmitted to the calling terminal. The calling terminal receiving the connect command returns back a connect acknowledgement.

After executing a G3 FAX protocol of CCITT Recommendation T.30, the calling terminal transmits a disconnect command requesting to disconnect the call. The called terminal receiving this command releases the call and transmits a release command notifying of such effect. The calling terminal receiving this command sends a release complete command announcing completion of call release to the called terminal to thereafter terminate the communication.

As described above, according to this embodiment, regardless of whether the calling terminal requests communication with or without a modem, data can be received. Communication is therefore allowed in accordance with the function of a calling terminal.

The data reception procedure by the terminal constructed as shown in FIG. 2 has been described. Next, the data transmission procedure by the terminal shown in FIG. 2 will be described with reference to the flow chart of FIG. 5 and procedure signals shown in FIGS. 6 and 7.

Figure 5:
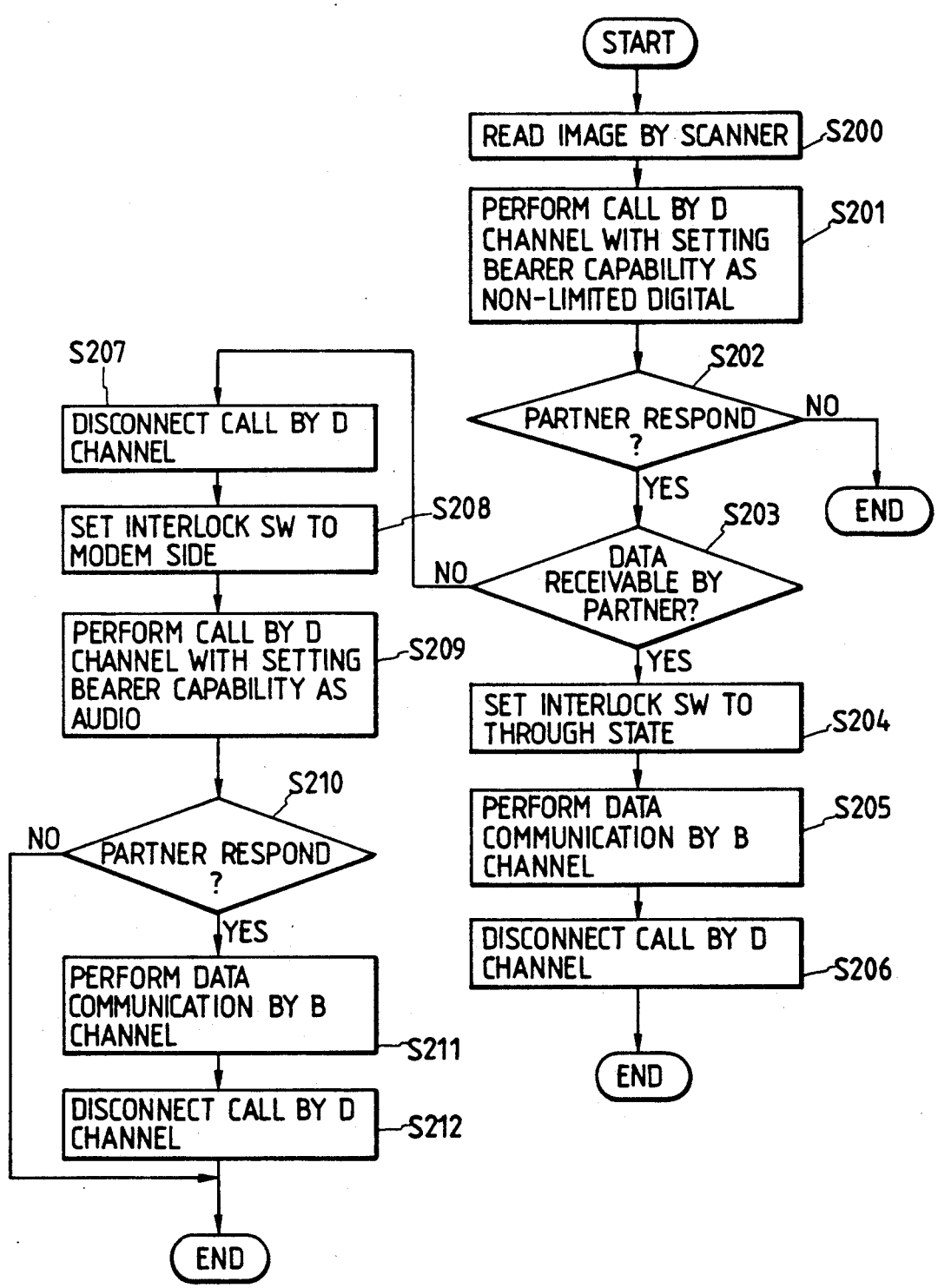
FIG. 5 is a flow chart showing the control procedure for data transmission according to an embodiment of this invention.

Referring to FIG. 5, at step S200 an image data read with the scanner 11 is converted into white/black binary data and temporarily stored in an image memory of the communication control unit 13. Thereafter, at step S201 when the communication control unit 13 instructs the D channel control unit 16 to send a call command, the D channel control unit 16 issues a call to ISDN by setting the bearer capability at a non-limited digital mode and setting the high layer compatibility (HLC) at G3. As the called party responds (step S202) and it is judged that the called party can communicate in the non-limited digital mode (S203), at step S204 the switches 17 are turned to the side bypassing the modem control unit 14 (through state). Next, at step S205 the communication control unit sends the image data to the B channel control unit 15 and communicates with the called terminal, in accordance with the protocol in conformity with CCITT Recommendations T.4 and T.30. Thereafter, at step S206 the call is disconnected to terminate transmission operation.

If it is judged at step S203 that the called party cannot receive in the non-limited digital mode, i.e., if the bearer capability of the called party uses the audio mode, at step S207 the communication control unit 13 executes a disconnection procedure to terminate the procedure. Thereafter, at step S208 the switches 17 are turned to the modem control unit 14 side. At step S209, the bearer capability is set at the audio mode and a call is again made. If it is judged at step S210 that the called party has responded, then at step S211 data are transmitted via the B channel. In this case, the data are modulated at the modem control unit 14. After completion of data transmission, the call is disconnected by way of the D channel at step S212.

Figure 6:
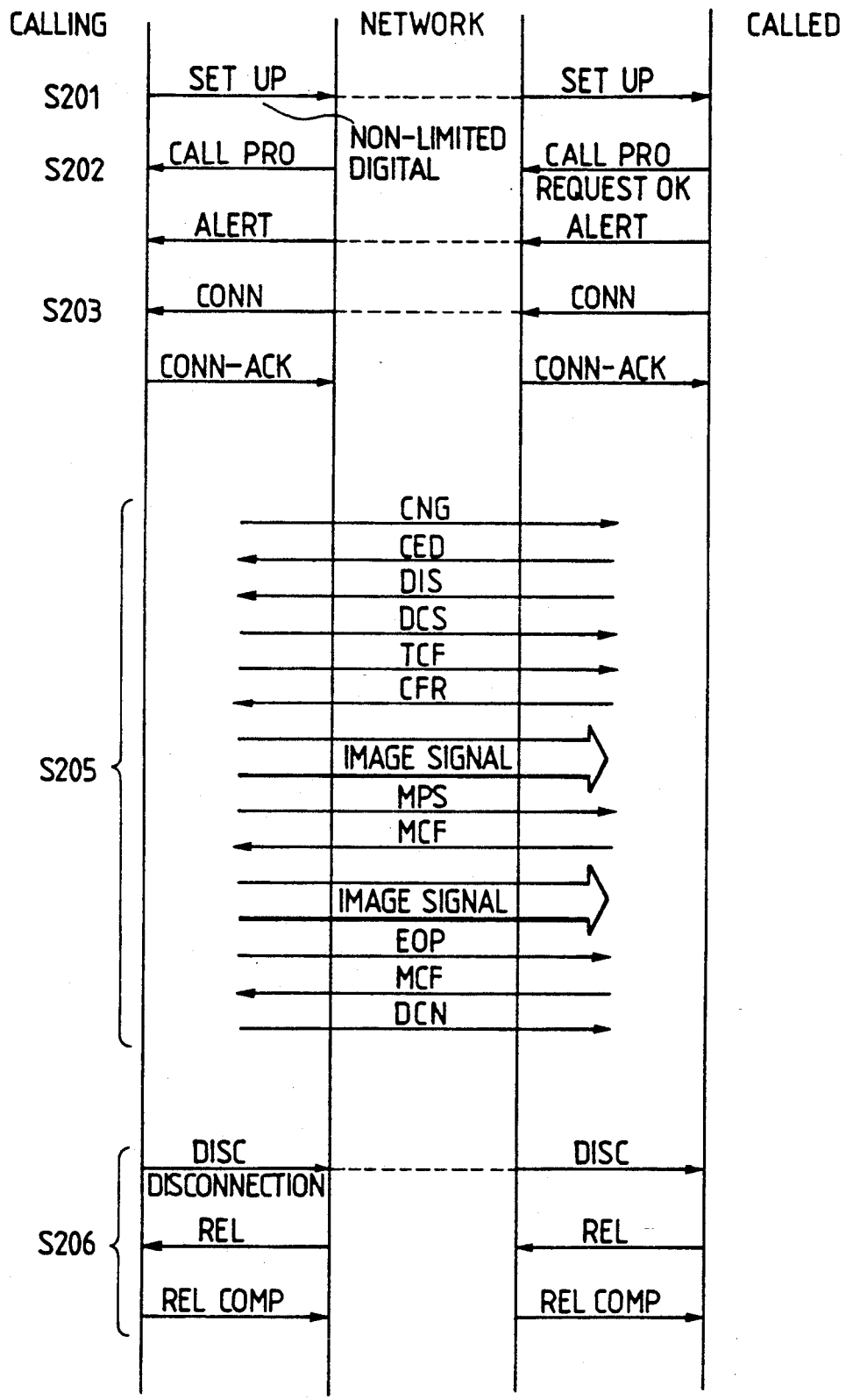
Figure 7:
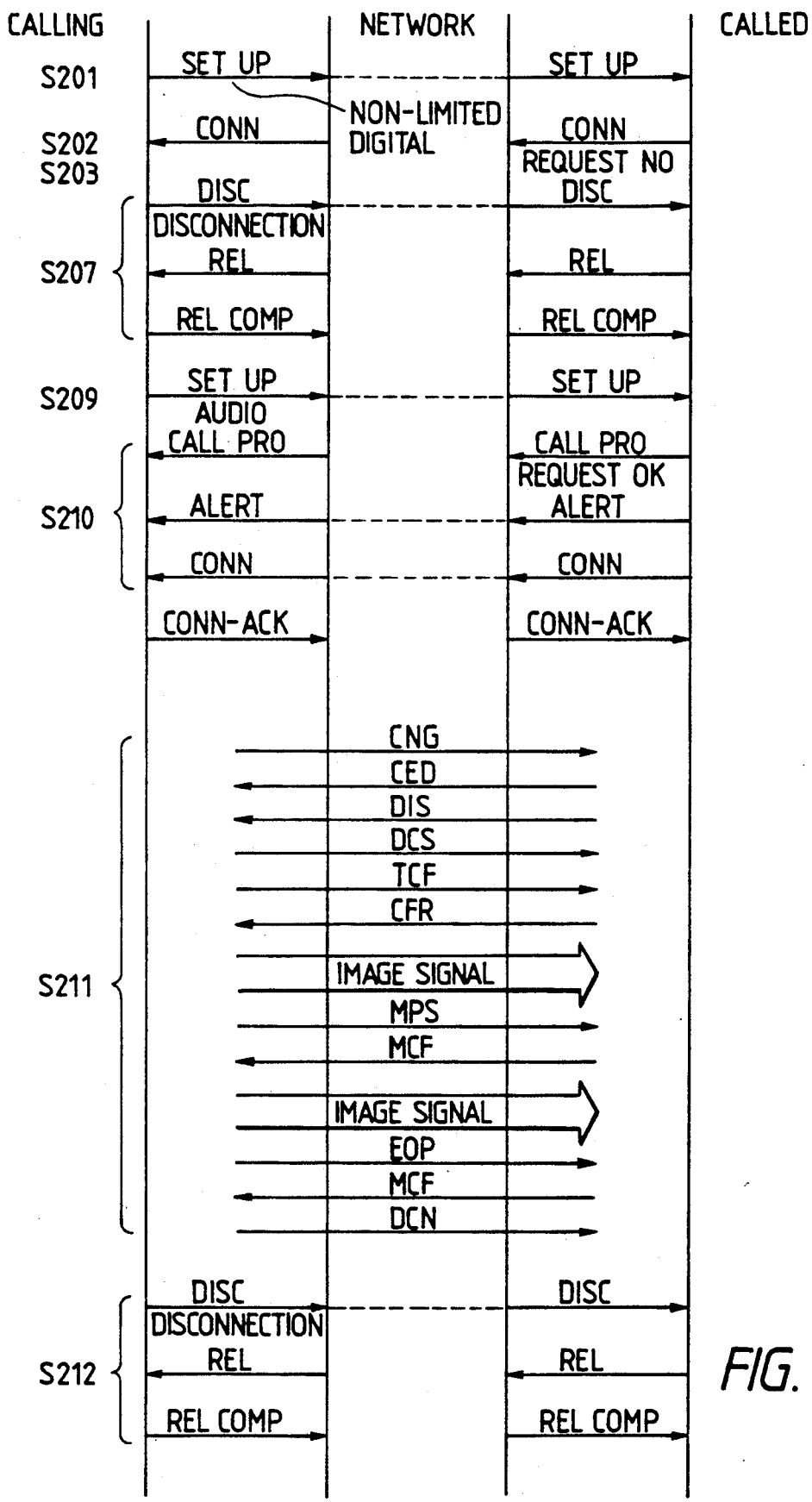

FIGS. 6 and 7 show procedure signals transferred between a calling terminal and called terminal. Step numbers S201, S202, S203, S205 and S206 shown in FIG. 6 and S201, S202, S203, S207, S209, S210, and S212 shown in FIG. 7 correspond to those shown in FIG. 5.

FIG. 6 shows the case where a calling terminal issues a call request by setting the bearer capability within a setup command at the non-limited digital mode, and the called terminal acknowledges the call request by sending the call proceeding command to communicate without using any modem.

Procedure signals shown in FIG. 6 are identical to those shown in FIG. 4, so the detailed description thereof is omitted.

FIG. 7 shows the case where a calling terminal issues a call request by setting the bearer capability within a setup command at the non-limited digital mode, and the called terminal does not respond to acknowledge the call request by sending a connect command.

The calling terminal sends a disconnect command to disconnect the call.

Thereafter, a call is again issued by setting the bearer capability within the setup command at the audio mode to execute data communication with a modem.

As described above, according to the embodiment shown in FIG. 6, data are transmitted without using any modem by declaring the non-limited digital mode. It is therefore possible to shorten a communication time to be less than the time required when using a modem, and to suppress the occurrence of transmission errors to a minimum. According to the embodiment shown in FIG. 7, a call request is issued by setting the bearer capability at the non-limited digital mode, and if the called party cannot acknowledge the request, the call is disconnected and another call request is issued by setting the bearer capability at the audio mode, thereby allowing communication processing in accordance with the bearer capability of the called party.

In the above embodiments, a facsimile apparatus is used by way of illustration only. The present invention is not limited thereto, but is also applicable to communications by personal computers with the similar advantageous effects.

The present invention is not limited to the above-described embodiments, but various modifications are possible without departing from the scope of claims.

We claim:

1. A data communication apparatus for communicating data over a line operable at a plurality of bearer capabilities, said apparatus comprising:
   a modem having a bearer capability;
   command receiving means for receiving a command for setting up a call with a transmitter of the command over the line, said command including a bearer capability of the transmitter;
   discriminating means for discriminating the bearer capability included in the command received by said command receiving means to produce a discrimination result indicating whether the included bearer capability corresponds to the bearer capability of said modem; and
   selecting means for selecting whether said modem is to be used or not in the call corresponding to the command, in accordance with the discrimination result of said discriminating means.

2. A data communication apparatus according to claim 1, wherein said discriminating means discriminates whether the bearer capability included in the command is a non-limited digital mode of the line or an audio mode corresponding to the bearer capability of said modem.

3. A data communication apparatus according to claim 2, wherein said selecting means selects that said modem is not to be used for data reception in the call when said discriminating means discriminates that the included bearer capability is the non-limited digital mode, and selects that said modem is to be used for data reception in the call when said discriminating means discriminates that the included bearer capability is the audio mode.

4. A data communication apparatus according to claim 1, further comprising image data receiving means and outputting means for outputting received image data, said image data receiving means and said outputting means using or not using said modem in accordance with the selection of said selecting means.

5. A data communication apparatus according to claim 4, wherein said data communication apparatus is connected to an integrated service digital network (ISDN), said command receiving means receives the command through a control channel of said ISDN, and said image data receiving means receives image data through an information channel of said ISDN.

6. A data communication apparatus comprising:
   a modem;
   notifying means for notifying a reception terminal that data is to be transmitted in a call thereto without using said modem;
   receiving means for receiving a response signal from the reception terminal in response to the notification;
   discriminating means for discriminating whether the response signal is an enable signal indicating that the reception terminal can receive data transmitted without using the modem; and
   data transmitting means for transmitting data to the reception terminal without using said modem when said discriminating means discriminates that the response signal is the enable signal.

7. A data communication apparatus according to claim 6, further comprising image reading means for reading an original document and generating image data, and wherein said data transmitting means transmits the image data generated by said image reading means.

8. A data communication apparatus according to claim 6, wherein when said discriminating means discriminates that the response signal is a disable signal indicating that the reception terminal cannot receive data transmitted without using said modem, said data transmitting means transmits data to the reception terminal by using said modem.

9. A data communication apparatus according to claim, 8, further comprising means for disconnecting the call when said discriminating means discriminates that the response signal is the disable signal, and then notifying the reception terminal that data is being transmitted by using said modem.

10. A data communication apparatus according to claim 6, wherein said notifying means notifies the reception terminal that the data is being transmitted without using said modem by transmitting a command for setting up the call to the reception terminal including a bearer capability at a non-limited digital mode.

11. A data communication apparatus according to claim 6, wherein said data transmitting means transmits the data by executing a G3 facsimile protocol of CCITT Recommendation T.30.

* * * * *